(12) United States Patent
McKown et al.

(10) Patent No.: US 8,149,899 B2
(45) Date of Patent: Apr. 3, 2012

(54) EFFICIENT DESPREAD AND RESPREAD OF MULTI-RATE CDMA SIGNALS

(75) Inventors: Russell C McKown, Richardson, TX (US); Christopher M Stillo, Garland, TX (US); Robert L Dawes, Bedford, TX (US)

(73) Assignee: Advanced Receiver Technologies, LLC, Dallas, TX (US)

( * ) Notice: Subject to any disclaimer, the term of this patent is extended or adjusted under 35 U.S.C. 154(b) by 647 days.

(21) Appl. No.: 12/323,520

(22) Filed: Nov. 26, 2008

(65) Prior Publication Data

US 2010/0128759 A1    May 27, 2010

(51) Int. Cl.
*H04B 1/00* (2006.01)
(52) U.S. Cl. .......................... 375/148; 375/349
(58) Field of Classification Search .................. 375/130, 375/140, 349, 144, 148
See application file for complete search history.

(56) References Cited

U.S. PATENT DOCUMENTS

| | | | |
|---|---|---|---|
| 6,904,076 B1 * | 6/2005 | Tsutsui et al. ................. | 375/130 |
| 2002/0154713 A1 * | 10/2002 | Sparrman et al. .............. | 375/346 |
| 2002/0159508 A1 * | 10/2002 | Miyoshi ......................... | 375/148 |
| 2003/0012269 A1 * | 1/2003 | Kanemoto et al. ............. | 375/150 |
| 2007/0041348 A1 * | 2/2007 | Kwun et al. .................... | 370/335 |
| 2007/0237255 A1 | 10/2007 | Riccio, Jr. | |
| 2010/0122143 A1 * | 5/2010 | Lee et al. ....................... | 714/752 |

OTHER PUBLICATIONS

Bahl, Sanat Kamal, "Design and Prototyping a Fast Hadamard Transformer for WCDMA", Department of Computer Science and Electrical Engineering, Proceedings of the 14th IEEE International Workshop on Rapid Systems Prototyping, 2003.
3rd Generation Partnership Project; Technical Specification Group Radio Access Network; Spreading and Modulation (FDD) (Release 5), 2004, 3GPP Organizational Partners, http://www.3gpp.org.
Bastug, Ahmet, Slock, Dirk T.M., "Special Issue on European Wireless 2004, Downlink WCDMA Receivers Based on Combined Chip and Symbol Level Equalisation", Wiley InterScience (www.interscience.wiley.com).

* cited by examiner

*Primary Examiner* — Emmanuel Bayard (57) ABSTRACT

A system and method, comprising a despread module that receives a descrambled signal and an identification of active codes, a soft-symbols memory communicably coupled to the despread module, and a respread module that receives the identification of active codes, a modulation type and gain estimate for the active codes, and soft symbol estimates for the active codes from the soft-symbols memory which is communicably coupled to the respread module, the despread module, comprising: a despread signal memory that receives the descrambled signal, a vector code despread module communicably coupled to the despread signal memory, an active code soft symbol grabber that receives the identification of active codes and is communicably coupled to the despread signal memory, wherein the despread signal memory receives properly arranged despread data from the vector code despread module, wherein if the despread data is associated with the identification of active codes, the active code soft symbol grabber transfers the despread data from the despread signal memory to the soft-symbols memory.

17 Claims, 10 Drawing Sheets

EFFICIENT DESPREAD AND RESPREAD OF MULTI-RATE CDMA SIGNALS

CROSS-REFERENCE TO RELATED APPLICATIONS

The present patent application is related to U.S. Provisional Patent Application 60/628,248 filed on Nov. 16, 2004, entitled Chip-Level No-Decision Feedback Equalizer For CDMA Wireless Systems, U.S. patent application Ser. No. 11/280,858 filed on Nov. 16, 2005, entitled Chip-Level No-Decision Feedback Equalizer For CDMA Wireless Systems, U.S. patent application Ser. No. 10/796,596 filed on Mar. 9, 2004, entitled Methods and Apparatus For Single Burst Equalization of Single Carrier Signals In Broadband Wireless Access Systems, and U.S. patent application Ser. No. 11/900,343 filed on Sep. 6, 2007, entitled "Method and Apparatus for Efficient Channel Estimate Based Timing Recovery, the contents of each of which are incorporated by reference herein.

BACKGROUND OF INVENTION

In Code Division Multiple Access (CDMA) communication systems, multiple data channels are provided by spreading the data of individual users with unique spread codes. Traditionally, the elements that are communicated on the data channels are referred to as 'symbols' and the elements of the spread codes are referred to as 'chips'. An example of such a CDMA signal is the Wideband Code Division Multiple Access (WCDMA) signal specified by the $3^{rd}$ Generation Partnership Project (3GPP) standards organization. Other examples for mobile wireless networks are the CDMA2000 family of signals and the TD-SCDMA signals contained in these two alternative CDMA technologies. These standardized CDMA technologies provide third generation (3G) mobile voice/phone and internet/data service to a growing number of wireless subscribers/users around the world.

At the CDMA signal transmitter, a CDMA signal for multiple channel transmission can be created by summing different spread code channel signals. These individual code channel signals are created by modulating a selected spread code sequence with a symbol from an assigned user data channel. At the CDMA signal receiver, knowledge of the spread code used at the transmitter is required so that the receiver can extract the data/symbol of interest to the user. This code knowledge is provided to the user's receiver, for example, as part of the network-subscriber link acquisition procedure. Under ideal radio wave propagation conditions, the performance of the CDMA receiver for an individual user data channel does not benefit from knowing the spread codes that are simultaneously being used on channels that have been assigned to other users.

Under realistic, non-ideal radio wave propagation conditions and in the real world environment of multiple base station networks, the multiple user/multiple base station CDMA signals interfere with each other such that the performance of traditional, 'assigned code only' receivers, can be severely degraded. An example of an 'assigned code only' receiver is a code-matched, channel-matched filter receiver which is also known as the implementation of a 'Rake' receiver which is well known in the art. When used for the downlink receiver in a subscriber handset, the Rake receiver displays performance degradation with increasing levels of intracellular and/or intercellular interference.

Intracellular interference refers to the multiple user interference within a single-base-station cell that arises due to multiple propagation path (multipath) distortion of the radio signal. Multipath distortion causes the spread codes associated with multiple code channels to loose their mathematical property of orthogonality. This loss of spread code orthogonality due to multipath results in a performance degradation of the legacy 'assigned code only' Rake receiver. This performance degradation is sufficiently severe to make the use of the Rake receiver undesirable for 3G networks designed to provide mobile wireless broadband service to multiple users. An 'equalizer receiver' is based on a signal-estimation filter that approximately corrects the multipath distortion and approximately restores the orthogonality property of the multiple spread code signals that are contained in the received CDMA signal. An 'assigned code only' despreading operation will then provide a high performance detection of the symbols that are of interest to the user, even in propagation environments that contain significant multipath-derived intracellular interference.

Intercellular interference refers to the multiple base station interference that arises whenever the subscriber's received signal contains signals originating from two or more base stations transmitting on the same radio frequency. The topology and the frequency usage of the 3G CDMA networks results in intercellular interference being a significant factor in a large amount of the cell coverage area. Both the legacy Rake receiver and the equalizer receiver are sensitive to intercellular interference and incur significant performance degradation when it is present.

More complicated, 'advanced receivers', that can mitigate the effects of intercellular interference for real world multiple user/multiple base station CDMA networks, include techniques that address intercellular interference such as 'interference suppression by means of projection', for example U. Madhow and M. L. Honig, *MMSE Interference Suppression for Direct-Sequence Spread-Spectrum CDMA,* IEEE Transactions on Communications, Vol. 42, No. 12, pp. 3178-3188, December 1994, and techniques that perform interference cancellation where interfering signals are estimated and subtracted. For examples of the latter type of advanced receiver see A. Bastug and D. Slock, *Interference Canceling Receivers with Global MMSE—Zero Forcing Structure and Local MMSE Operations,* Proc. Asilomar Conf. on Signals, Systems & Computers, November 2003. Interference cancellation receivers can provide a higher level of performance than interference suppression techniques, but special care must be taken to keep their implementations computationally efficient.

One practical problem that arises in the implementation of interference cancellation receivers is the computational burden associated with the additional signal processing required to individually despread each of the multiple CDMA signals, perform symbol decisions on each active code channel within each interfering signal, respreading the symbol decisions and finally summing the respread signals for all active code channels within each interfering signal.

For convenience, the sequential combination of code despread, symbol decision, code respread and respread summation operations will be referred to here as a "Despread-Respread" operation. The code despread operation is a series-to-parallel data conversion while the respread summation operation is a parallel-to-series data conversion. The complete Despread-Respread operation is necessary to obtain estimates of the active-code, chip-rate data in the interfering CDMA signals as they appear at the transmitting base stations. These estimates can then be multiplied by the scrambling code of the interfering base station, rechannelized and subtracted off from the received signal to accomplish the desired interference cancellation.

Another benefit of the Despread-Respread operation is that it allows a higher performance estimation of the propagation channel impulse response (CIR) as discussed by S. F. A. Shah and A. U. H. Sheikh, in the paper "Downlink Channel Estimation for IMT-DS", in vol. 2 of the 12th IEEE International Symposium on Personal, Indoor and Mobile Radio Communications, 2001. Improving the quality of the channel estimate improves receiver performance by improving the processing that compensates for the multipath channel distortion, e.g., improved channel equalization. The improved CIR estimate also improves the accuracy of the rechannelization used in the interference cancellation.

Given the utility and benefit of the Despread-Respread operation for interference cancellation and high performance channel estimation, a system and method that provides an efficient means of performing this operation is desired.

SUMMARY OF INVENTION

The present invention provides a system and method for performing code despread, symbol decisions and code respread operations for the active channels in a multi-rate CDMA signal.

In one embodiment, a system comprises a despread module that receives a descrambled signal and an identification of active codes, a soft-symbols memory communicably coupled to the despread module, and a respread module that receives the identification of active codes, a modulation type and gain estimate for the active codes, and soft symbol estimates for the active codes from the soft-symbols memory which is communicably coupled to the respread module, the despread module, comprising: a despread signal memory that receives the descrambled signal, a vector code despread module communicably coupled to the despread signal memory, an active code soft symbol grabber that receives the identification of active codes and is communicably coupled to the despread signal memory, wherein the despread signal memory receives properly arranged despread data from the vector code despread module, wherein if the despread data is associated with the identification of active codes, the active code soft symbol grabber transfers the despread data from the despread signal memory to the soft-symbols memory.

In one embodiment, a system comprises a despread module that receives a descrambled signal, an identification of active codes, and properly arranged despread data, a soft-symbols memory communicably coupled to the despread module, and a respread module that receives the identification of active codes, a modulation type and gain estimate for the active codes, and soft symbol estimates for the active codes from the soft-symbols memory which is communicably coupled to the respread module, wherein if the properly arranged despread data is associated with the identification of active codes, the despread module transfers the despread data to the soft-symbols memory.

In one embodiment, a system comprises a despread signal memory that receives a descrambled signal, a vector code despread module communicably coupled to the despread signal memory, an active code soft symbol grabber that receives an identification of active codes and is communicably coupled to the despread signal memory, wherein the despread signal memory receives properly arranged despread data from the vector code despread module, wherein if the despread data is associated with the identification of active codes, the active code soft symbol grabber transfers the despread data from the despread signal memory to the soft-symbols memory.

In one embodiment, a method comprises receiving an input vector from memory, providing an output vector to the memory based on the received input vector, determining input addresses in the input vector based on processing indices, loading input registers from the input vector, determining output registers based on half a sum of the input registers and based on half a difference of the input registers, determining output addresses in the output vector based on processing indices, and providing values of the output registers to elements in the output vector based on the determined output addresses.

In one embodiment, a system comprises a despread module that receives a descrambled signal and an identification of active codes, a soft-symbols memory communicably coupled to the despread module, and a respread module that receives the identification of active codes, a modulation type and gain estimate for the active codes, and soft symbol estimates for the active codes from the soft-symbols memory which is communicably coupled to the respread module, the respread module, comprising: an Active Code Hard-Symbol Inserter module that receives soft-symbol estimates for active codes, identification of the active codes and modulation type and gain estimates for the active codes, a Respread Signal Memory that receives a hard-symbol from the Active Code Hard-Symbol Inserter module, a Vector Code Respread module, and a Respread Tree Level Control module that transmits a tree level to the Active Code Hard-Symbol Inserter module and the Vector Code Respread module, the Vector Code Respread module provides data to formula-addressed output elements of the Respread Signal Memory, and the Respread Signal Memory outputs an Estimate of a Chip-rate Summed-Channels Signal for the Active Codes.

In one embodiment, a system comprises an Active Code Hard-Symbol Inserter module that receives soft-symbol estimates for active codes, identification of the active codes and modulation type and gain estimates for the active codes, a Respread Signal Memory that receives a hard-symbol from the Active Code Hard-Symbol Inserter module, a Vector Code Respread module, and a Respread Tree Level Control module that transmits: a tree level to the Active Code Hard-Symbol Inserter module and the Vector Code Respread module, and a clear message to the Respread Signal Memory, the Vector Code Respread module: inputs data from formula-addressed input elements of the Respread Signal Memory, performs additive operations involving two inputs and two outputs, and provides data back to formula-addressed output elements of the Respread Signal Memory, the Respread Signal Memory outputs an Estimate of a Chip-rate Summed-Channels Signal for the Active Codes.

In one embodiment, a method comprises providing an output vector to memory based on a received input vector, determining input addresses in an input vector based on processing indices, loading input registers from the input vector, determining output registers based on a sum of the input registers and based on half a difference of the input registers, determining output addresses in the output vector based on processing indices, and providing values of the output registers to elements in the output vector based on the determined output addresses.

DETAILED DESCRIPTION OF THE INVENTION

The present invention provides a module or system and a method of code despread, symbol decision, code respread and respread summation that can be used in a joint detection based interference cancellation receiver for CDMA signals. For convenience, the sequential combination of code despread, symbol decision, code respread and respread summation operations will be referred to here as a "Despread-Respread" operation. Each of the depicted and described modules of the present invention can be implemented in hardware, software or firmware or a combination thereof. The present invention is relevant to multi-rate CDMA communication systems where the spread codes used to channelize the individual user data streams are selected from an orthogonal variable spreading factor (OVSF) tree. For example, the Universal Mobile Telecommunications System (UMTS) family of network technical specifications includes the WCDMA, TD-CDMA, and TDS-CDMA designated air interfaces, all of which utilize the same OVSF code tree.

Figure 1:
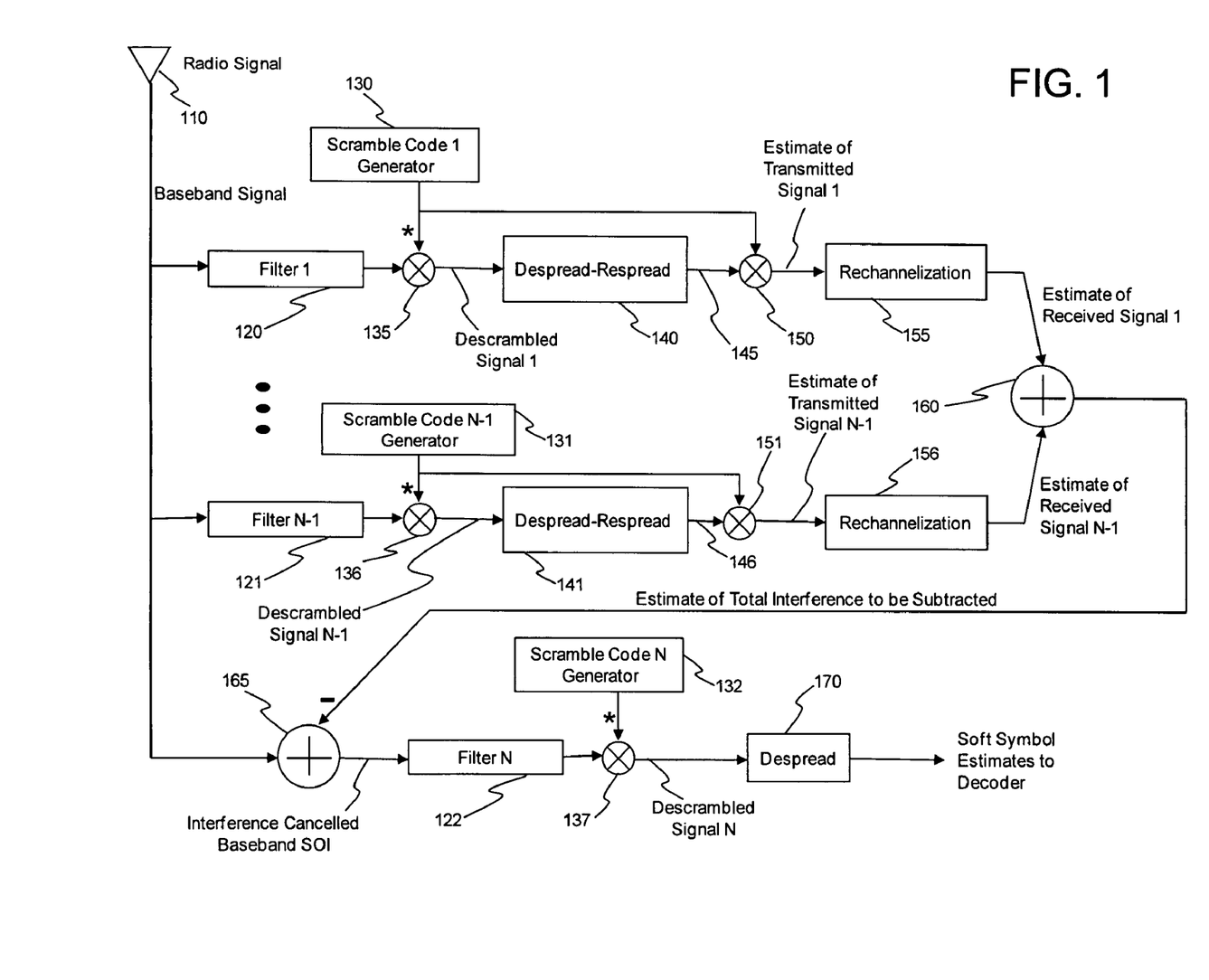
FIG. 1 depicts a block diagram of an example implementation of a Despread-Respread module within a single antenna interference cancellation receiver that uses joint detection in accordance to an embodiment of the present invention.

FIG. 1 provides an example implementation of Despread-Respread modules 140 and 141 within a single antenna interference cancellation (SAIC) receiver that uses joint detection (JD). This type of receiver is known in the 3rd Generation Partnership Project (3GPP) standards community as an SAIC-JD receiver. In FIG. 1, the SAIC-JD is processing N CDMA signals that originate from N separate CDMA transmitters. The N'th CDMA signal is the user's signal of interest (SOI) and the signals designated as Signal 1 to Signal N-1 are CDMA signals that interfere with the CDMA SOI. As shown, all N CDMA signals are received with the single antenna 110 and frequency down-converted to a baseband signal. The down-conversion process is well known and not shown. It is also well known to persons trained in the field that other interference cancellation receiver structures exist that require the Despread-Respread function, for example, multiple antenna interference cancellation receivers that use joint signal detection. Joint detection receivers are also referred to as multiuser detection (MUD) receivers.

For each of the N-1 interfering CDMA signals that are processed by the SAIC-JD receiver in FIG. 1, a chip-rate baseband signal processing filter, such as module 120 or 121, is applied to the received baseband signal to provide compensation for the signal distortion created by the multipath radio propagation channel from the interfering transmitter to the receiver. Examples of such filters are a channel-matched filter or a signal-estimation filter such as a minimum mean squared error (MMSE) filter. The filtered chip-rate signal can then be descrambled by multiplication, 135 or 136, with a known, complex conjugate scramble code that can be locally generated, 130 or 131, and is specific to the CDMA transmitter. (The complex conjugate is indicated by the * in FIG. 1.) The resultant Descrambled Signals 1 to N-1 are each associated with an individual interfering transmitter and are each input to one of the N-1 Despread-Respread modules, e.g., 140 and 141. The chip-rate outputs of the N-1 Despread-Respread modules are N-I Summed-Channels Signal for the Active Codes, e.g., 145 and 146, that are individually multiplied by the known scramble code for the associated transmitter, e.g., at 150 and 151, to form estimates of the N-1 transmitted interfering signals. In the N-1 rechannelization modules, e.g., at 155 and 156, these estimates of the transmitted interfering signals are convolved with the estimated CIR's for the associated transmitter-to-receiver channel. These N-1 rechannelization operations form estimates of the N-1 received signals from the N-1 interfering CDMA transmitters. The summation at 160 of the N-1 estimated received interfering signals forms the Estimate of Total Interference to be Subtracted at 165 from the Baseband Signal to accomplish the desired interference cancellation.

The chip-rate output of 165 in FIG. 1 is the Interference Cancelled Baseband SOI that is input to the filter 122 which provides compensation for the signal distortion created by the multipath radio propagation channel from the desired SOI transmitter to the receiver. The output of filter 122 is descrambled by multiplication, at 137, with the known, complex conjugate scramble code from the SOI scramble code generator 132, to provide the Descrambled Signal N for the CDMA SOI. The active codes of interest to the user are despread in module 170 to provide soft symbol estimates as the output of the SAIC-JD receiver to the 'decoder'.

The reference to the 'decoder' in FIG. 1 refers to whatever is the appropriate post-receiver demultiplexing/decoding processing as specified in a reference wireless standard. For example, if the SAIC-JD is for a 3G handset, the 'decoder' is the demultiplexing/decoding processing defined by the 3GPP specifications for the WCDMA FDD downlink physical layer for user devices in general and dynamically specified in detail by the SOI base station using 'over-the-air' format commands for each particular user device. The operation of the SAIC-JD receiver in FIG. 1 is not influenced by this subsequent 'decoder' processing.

Figure 2:
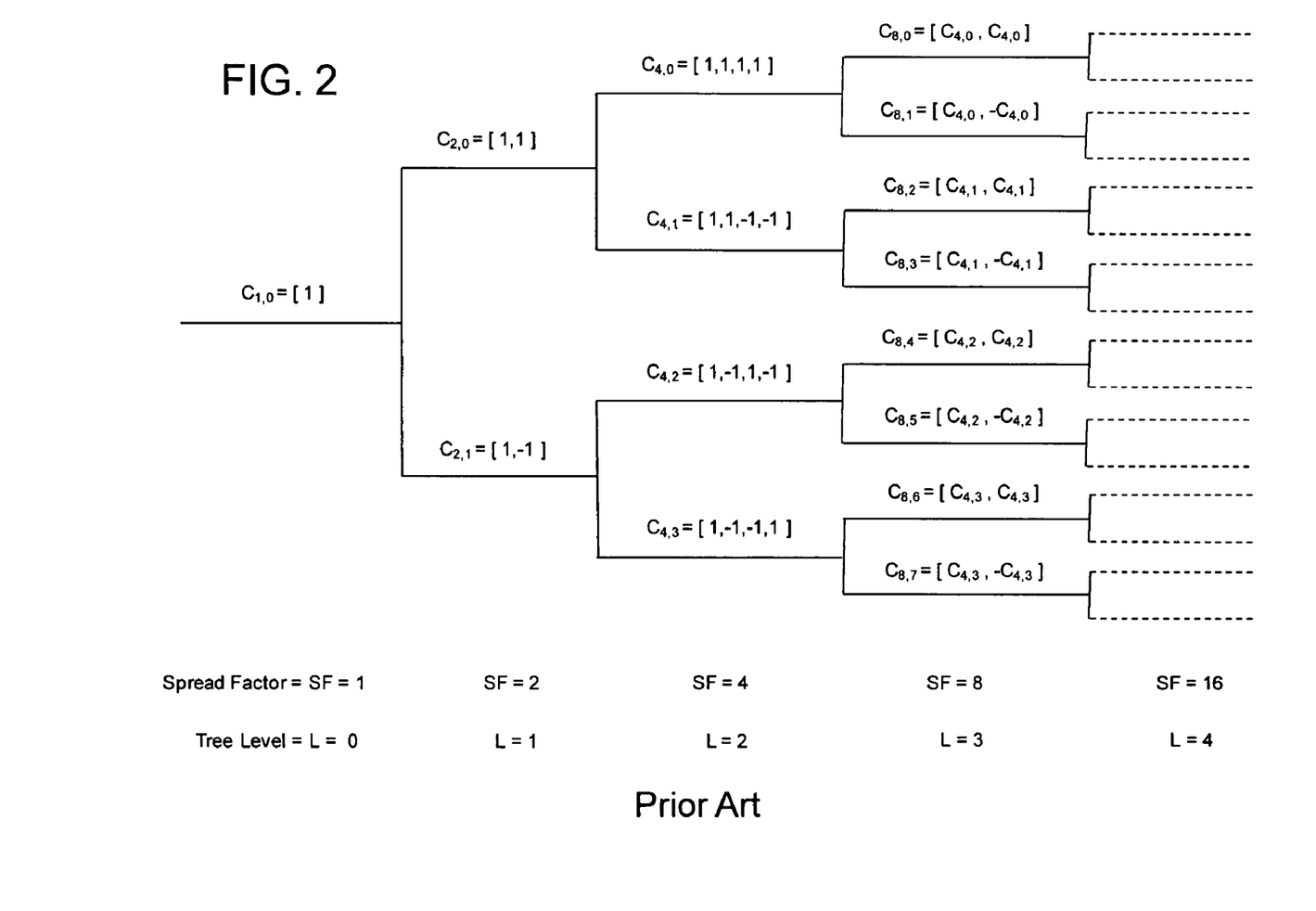
FIG. 2 references a prior art example of the OVSF code tree used in the WCDMA, TD-CDMA, and TDS-CDMA UMTS air interfaces.

FIG. 2 provides a reference example of the OVSF code tree used in the WCDMA, TD-CDMA, and TDS-CDMA UMTS air interfaces (see for example, *Technical Specification Group Radio Access Network: Spreading and Modulation (FDD)*, 3GPP TS 25.213 V5.5.0, 2003-12). The data channelization spread codes are uniquely described as $C_{SF,j}$ where SF is the spreading factor of the code and j is the code number, such that $0 \leq j \leq SF-1$. Each Tree Level (=L) in the OVSF code tree defines spread codes of length SF corresponding to a specific spreading factor $SF=2^L$ where L=0, 1, 2, 3, etc. The spread factor SF is equal to the CDMA signal's chip rate divided by the code channel's symbol rate. FIG. 2 illustrates the OVSF spread codes for SF=1, SF=2, SF=4 and SF=8. The spread codes of the OVSF tree, $C_{SF,j}$, can be generated as:

$C_{1,0}=1$, $C_{2,0}=[1, 1]=[C_{1,0}, C_{1,0}]$ $C_{2,1}=[1, -1]=[C_{1,0}, -C_{1,0}]$ $C_{4,0}=[1, 1, 1, 1]=[C_{2,0}, C_{2,0}]$ $C_{4,1}=[1, 1, -1, -1]=[C_{2,0}, -C_{2,0}]$ $C_{4,2}=[1, -1, 1, -1]=[C_{2,1}, C_{2,1}]$ $C_{4,3}=[1, -1, -1, 1]=[C_{2,1}, -C_{2,1}]$ and so on for continued doubling of the spread factor SF and expansion of the code number j range as SF increases, i.e., j=0, 1, 2 . . . SF−1. The air interface specifications state the levels of the OVSF code tree that are available for data channel assignment by specifying the allowed spread factor range. For example, the WCDMA air interface provides that the allowed OVSF code usage is in the spread factor range $SF_{min} \leq SF \leq SF_{max}$, where $SF_{min}=4$ and $SF_{max}=512$. The present invention for a method of performing the Despread-Respread operation for multi-rate CDMA signals exploits these well known 'generation' properties of the OVSF code tree.

It is evident from FIG. 2 and the above code generation formula that two OVSF codes at a given SF level, for example SF=4, are generated from each OVSF code at the 'previous' OVSF code tree level SF'=SF/2, which in this example is the SF'=2 level, e.g., both $C_{4,2}$ and $C_{4,3}$ are generated from $C_{2,1}$. It is useful to note this generational relationship between the codes by referring to the generated codes, e.g., codes $C_{4,2}$ and $C_{4,3}$, as 'children' with an individual generated code, e.g., code $C_{4,2}$, referred to a as a 'child' code. It is also useful to refer to the code from which the children codes are generated, e.g., $C_{2,1}$, as a 'parent' code. Furthermore, it is useful to refer to 'the parent code of a parent code' as simply a 'parent code' and to 'the children codes of children codes' as simply 'children codes' and similarly for additional generations of either parents or children. This terminology results in the term 'parent codes of a specific code' including all codes of lower SF value from which the specific code can be generated and the term 'children codes of a specific code' including all codes of higher SF that can be generated from the specific code.

A well known mathematical property of the OVSF code tree is that, by construction, specific codes are not orthogonal to either their parent codes or their children codes. This contrasts with the OVSF codes at a given SF defined code tree level which are all orthogonal with respect to each other. It also contrasts with the OVSF codes at different tree levels that are unrelated, i.e., have no parent codes in common, and which, as a result, are also orthogonal with respect to each other. The lack of orthogonality between the parent and children OVSF codes has the consequence that if a given code is assigned to be active, then the given code's parent codes and children codes are not available for use. In this case, these non-available codes are said to be 'blocked'. The present invention for a method of efficiently performing the Despread-Respread operation for multi-rate CDMA signals exploits these well known code assignment 'blocking' properties of the OVSF code tree.

Figure 3:
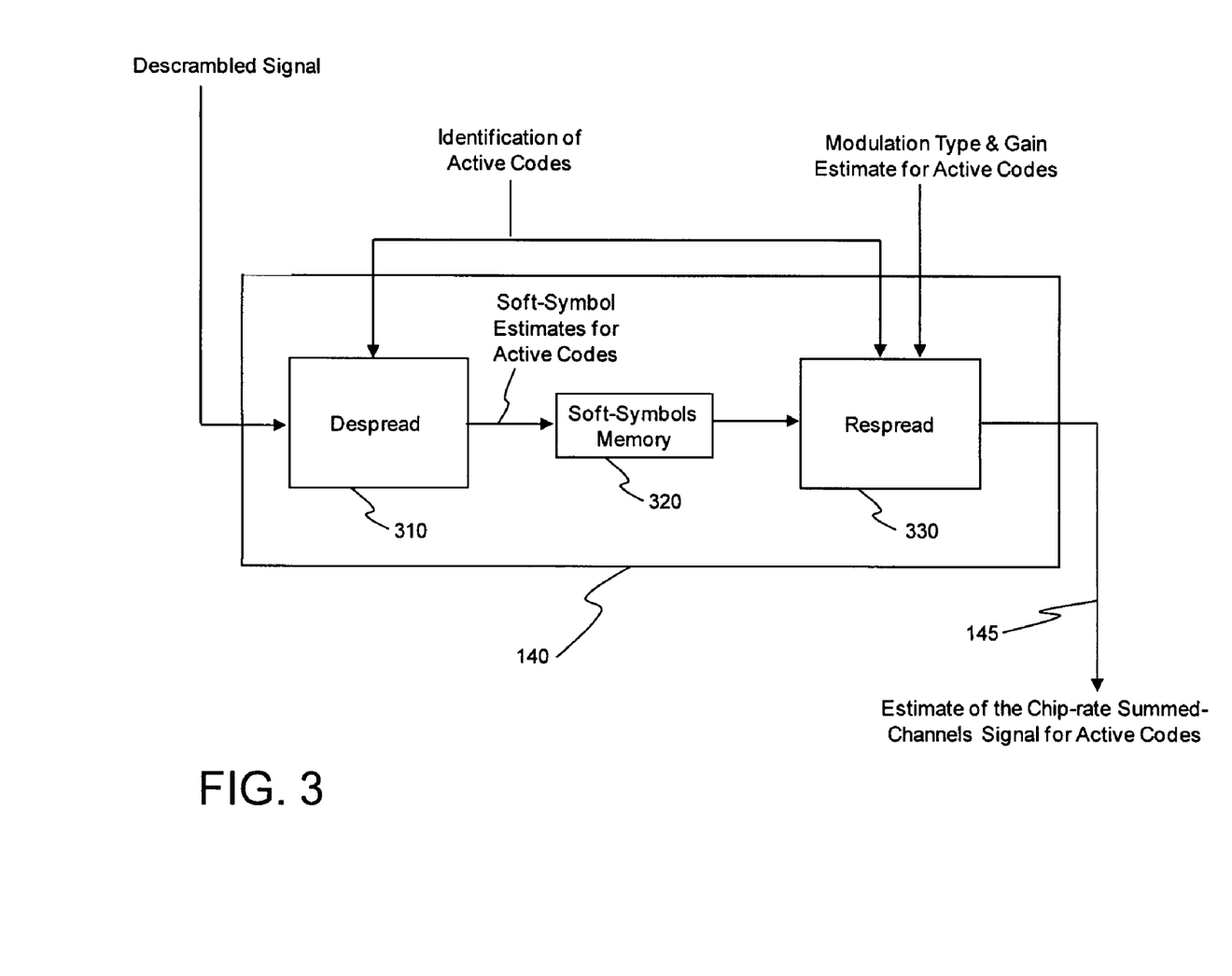
FIG. 3 shows a block diagram of certain processes performed by an implementation of the Despread-Respread module in accordance to an embodiment of the present invention.

FIG. 3 shows a block diagram of certain processes performed by an implementation of the Despread-Respread module 140 of the present invention. The Despread module 310 inputs the chip-rate Descrambled Signal and the Identification of Active Codes, performs a code despreading operation for the active code channels and outputs the results of the despreading operation as Soft-Symbol Estimates for Active Codes for storage in the Soft-Symbols Memory module 320. The Respread module 330 inputs these soft-symbol estimates from the Soft-Symbols Memory module 320. The Respread module 330 also inputs the Identification of Active Codes, and the Modulation Type and Gain Estimate for Active Codes. Given these inputs, the Respread module 330 performs a code spreading operation for the active code channels and outputs the Estimate of the Chip-Rate Summed-Channels Signal for the Active Codes, e.g. 145 in FIG. 1.

Figure 4:
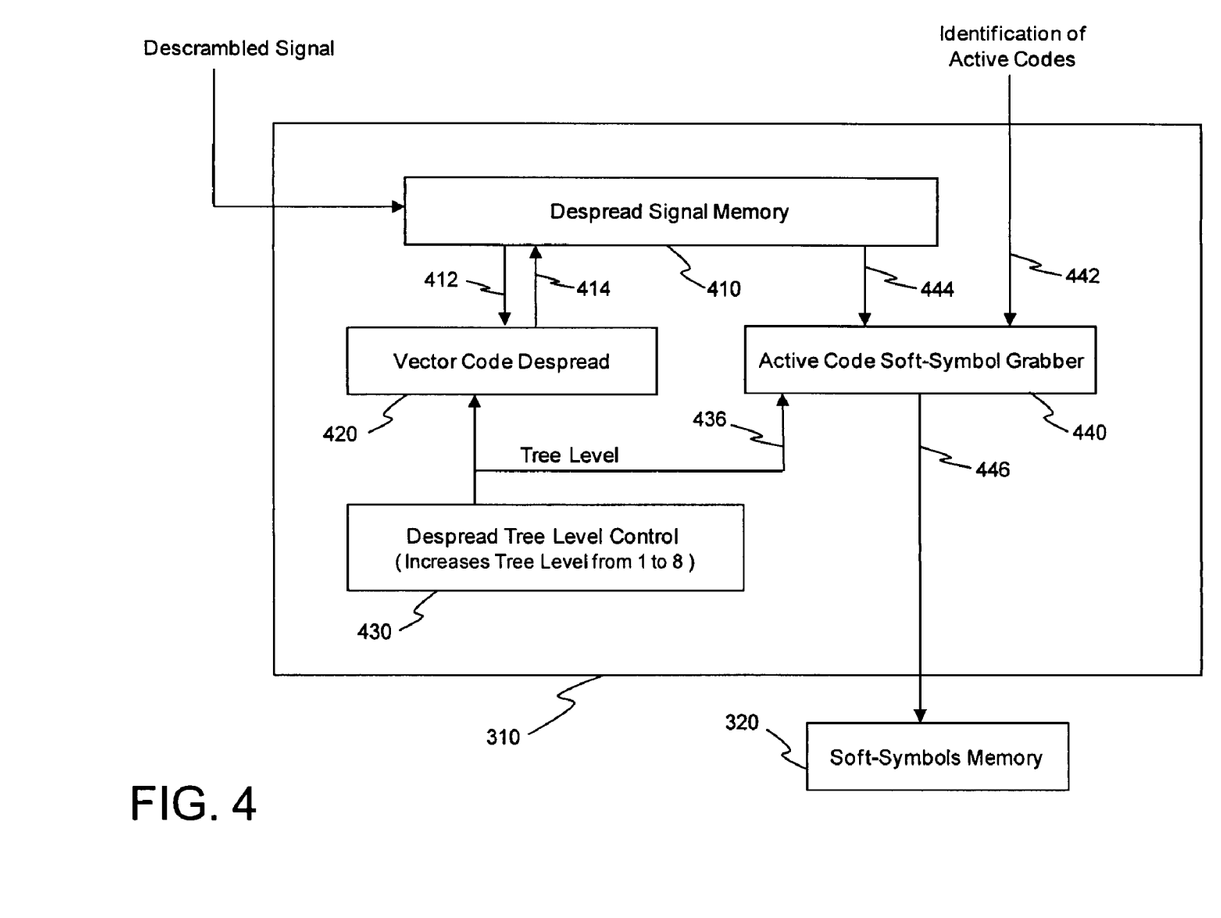
FIG. 4 show a block diagram of certain processes performed by implementations of the Despread module in accordance to an embodiment of the present invention.
Figure 7:
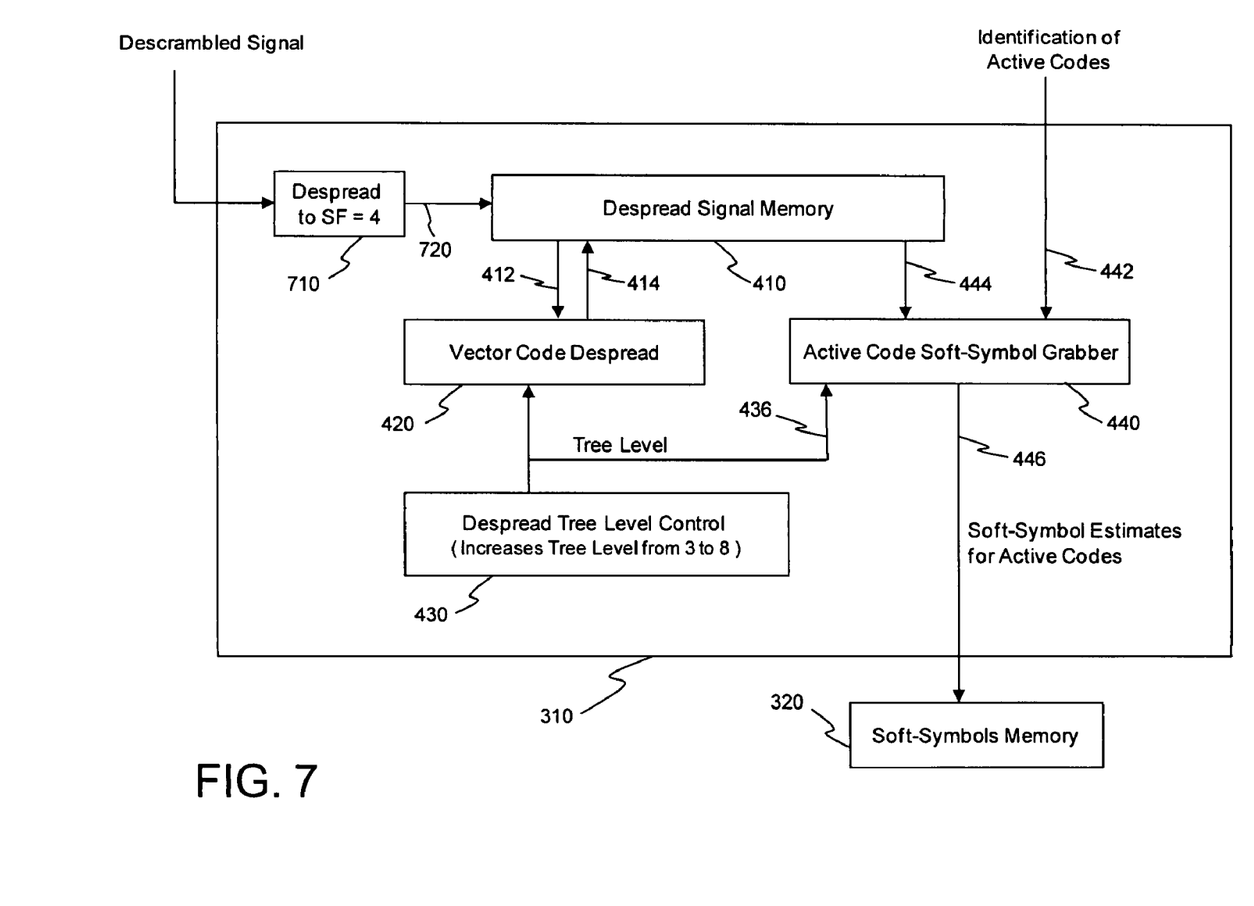
FIG. 7 shows a block diagram of certain processes performed by an alternative example implementation of the Despread module in accordance to an embodiment of the present invention.

FIGS. 4 and 7 show block-diagrams of certain processes performed by implementations of the Despread module 310 of the present invention. In an example WCDMA downlink receiver embodiment, the despread processing begins when the Despread Signal Memory 410 contains 256 chips of "SF=256 spread-code-aligned" Descrambled Signal wherein the $1^{st}$ chip of the Descrambled Signal corresponds to the first chip of the OVSF despread codes for spread factor SF=256. In practice, this SF=256 spread-code-alignment is always available given the slot synchronization portion of CDMA signal detection and acquisition. The Vector Code Despread module 420 and the Active Code Soft-Symbol Grabber module 440 operate in concert to capture the desired soft-symbols of the active codes and store them in the Soft-Symbols Memory 320. The Despread Tree Level Control module 430 coordinates the Vector Code Despread 420 and the Active Code Soft-Symbol Grabber 440 by incrementing the Tree Level parameter 436 from 1 to 8 in steps of 1. When the processing for Tree Level=8 is finished, the output of the Despread module 310 is the complete set of Soft-Symbol Estimates for Active Codes which are stored in the Soft-Symbols Memory 320.

The Vector Code Despread module 420 inputs data 412 from formula-addressed input elements of the Despread Signal Memory 410, performs additive operations involving two inputs and two outputs, and provides data back 414 to formula-addressed output elements of the Despread Signal Memory 410. For example, in a preferred embodiment for the WCDMA downlink signal, the input 412 and output 414 to the Vector Code Despread module 420 are complex vectors of length 256 and the computation of the Vector Code Despread can be written as:

```
for k = 0, SF_hi, 2*SF_hi, 3*SF_hi ... n*SF_hi < 256
    for m = 1:SF_lo
        C = Input( k + m )
        D = Input( k + SF_lo + m )

A = [C + D] / 2
        B = [C - D] / 2

Output( k + 2*m−1 ) = A
        Output( k + 2*m ) = B
    end
end
``` where SF_hi is the spread factor associated with the output data such that SF_hi=2*SF_lo where SF_lo is the spread factor associated with the input data; and where n=(256/SF_hi)−1. The formula-addressed input elements are the elements of the input memory with addresses defined by the formulas k+m and k+SF_lo+m. The formula-addressed output elements are the elements of the output memory with addresses defined by the formulas k+2*m−1 and k+2*m. The two input, two output additive computation is contained in the above box; the 'division' by 2 is recognized as a simple bit-shift of the output of the addition. An alternative normalization scheme is to perform a division by the square root of 2 and is referred to herein as the alternative despread normalization scheme.

Figure 5:
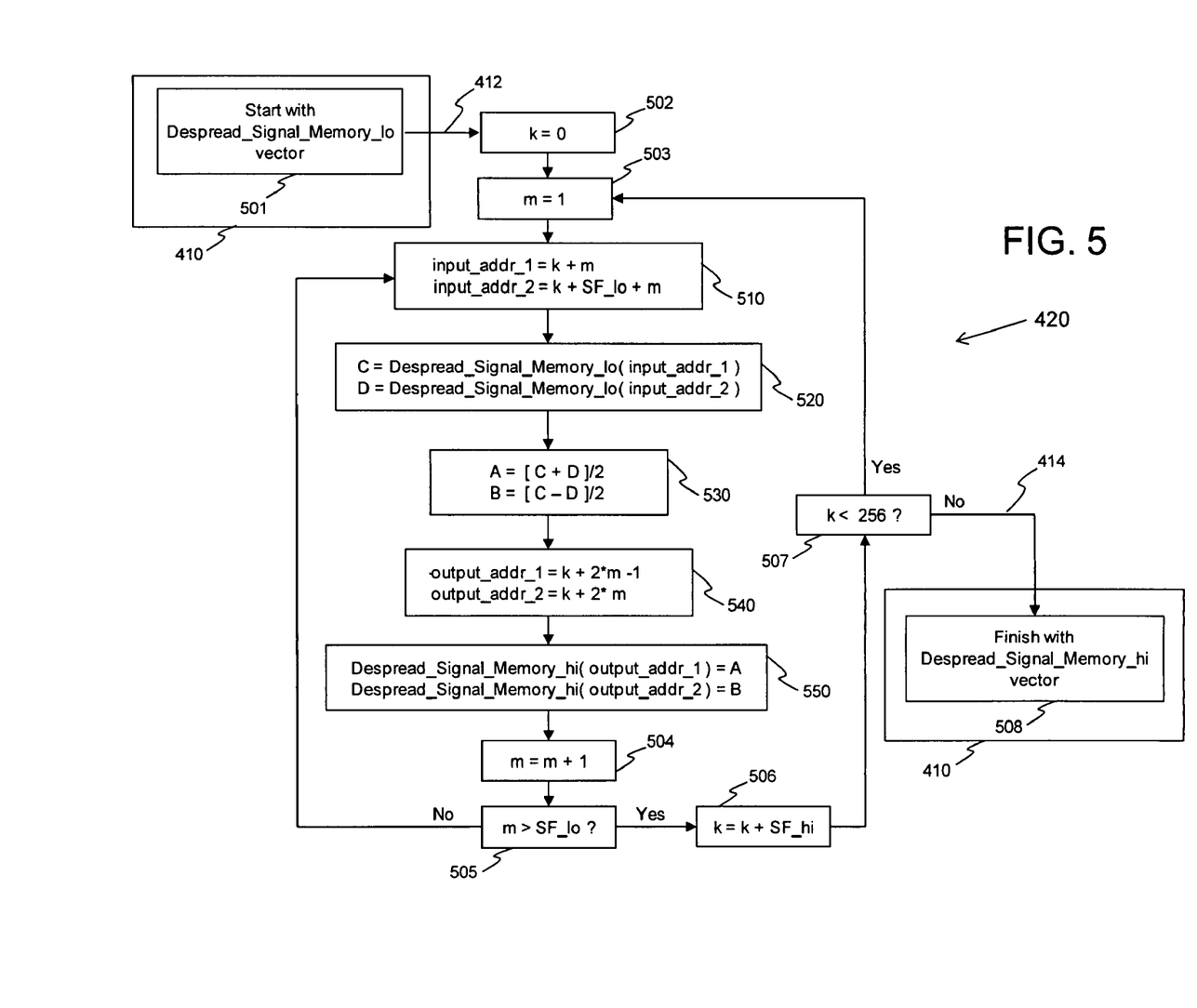
FIG. 5 shows a flow chart diagram of certain processes performed by an implementation of the Vector Code Despread module in accordance to an embodiment of the present invention.

FIG. 5 shows a flow chart diagram of certain processes performed by an implementation of the Vector Code Despread module 420 of the present invention. As indicated in FIG. 5, the Vector Code Despread 420 receives an input vector, Despread_Signal_Memory_lo, from 412 the Despread Signal Memory 410 and provides an output vector, Despread_Signal_Memory_hi, back to 414 the Despread Signal Memory 410. The input of Tree Level 436 is implicit in FIG. 5. Tree Level 436 determines the start and finish spread factors, SF_lo and SF_hi, respectively, according to the Tree Level and Spread Factor relation indicated in FIG. 2. For example, if Tree Level=1, then SF_lo=1, which corresponds to starting 501 with no code despreading in the signal data in Despread_Signal_Memory_lo and also SF_hi=2*SF_lo=2, which corresponds to finishing 508 with despread factor 2 signal data in Despread_Signal_Memory_hi. In general, $$SF\_lo = 2^{(Tree\,Level-1)} \text{ and}$$

$$SF\_hi = 2*SF\_lo = 2^{Tree\,Level}.$$

The Vector Code Despread 420 processing shown in FIG. 5 is repeated for each value of Tree Level 436, for example as indicated in FIG. 4, for each value of Tree Level from 1 to 8.

The control elements 502, 503, 504, 505, 506 and 507 manage the processing indices k and m that are used to compute the input addresses in 510. These input addresses are used in 520 to load input registers C and D from input vector Despread_Signal_Memory_lo. The output registers A and B are computed in module 530 based on half the sum and difference of C and D, respectively. The processing indices k and m are then used to compute the output addresses in 540. These output addresses are used in 550 to write the values of C and D to the elements in the output vector Despread_Signal_Memory_hi.

The utility of the Vector Code Despread module 420 is that it can be employed to efficiently perform the despreading operation for all OVSF codes. If the input of the Vector Code Despread module contains properly arranged despread 'symbols' at one Spread Factor or Tree Level of the OVSF code tree, then the module's output contains properly arranged despread 'symbols' at the next higher Spread Factor or Tree Level of the OVSF code tree. This allows the Vector Code Despread module to be used in a iterative manner to despread the Descrambled Signal to all possible codes in the OVSF code tree. The 'proper arrangement' is provided (defined) by the above Vector Code Despread computation provided that the SF_lo=1 input to the Vector Code Despread module 420 is the sample indexed Descrambled Signal.

Figure 6:
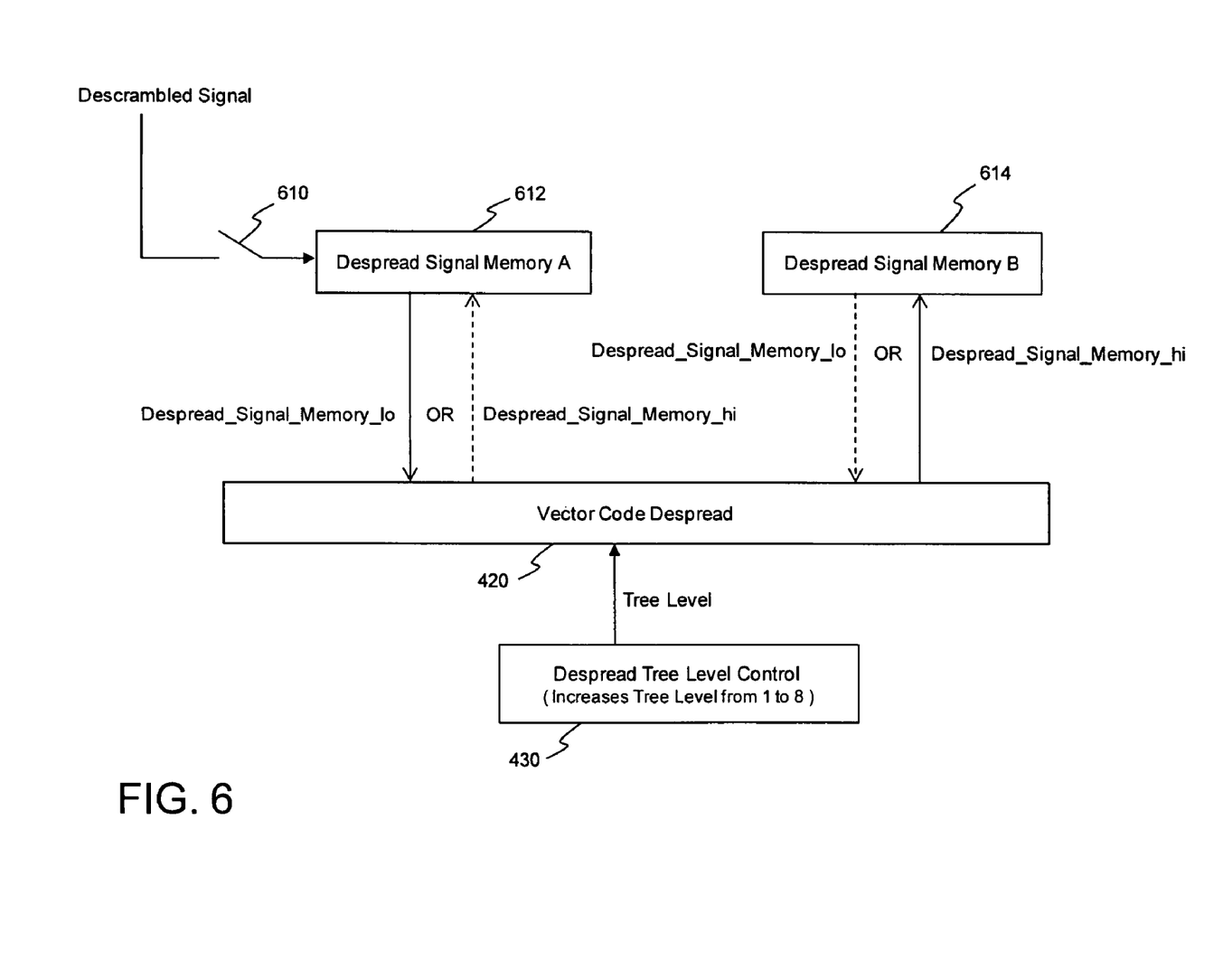
FIG. 6 shows a block diagram that contains a select subset of the modules in the Despread module and has the Despread Signal Memory partitioned into two halves, Despread Signal Memory A and Despread Signal Memory B in accordance to an embodiment of the present invention.

To illustrate the use of the Vector Code Despread module 420, FIG. 6 shows a block diagram that contains a select subset of the modules in the Despread module 310 and has the Despread Signal Memory (410 in FIG. 4) partitioned into two halves, Despread Signal Memory A 612 and Despread Signal Memory B 614. Initially, the switch 610 is closed and Despread Signal Memory A is loaded with 256 spread-code-aligned samples of the Descrambled Signal. The Despread Tree Level Control module 430 initializes the Tree Level to 1. The Vector Code Despread then inputs data, e.g., the Despread_Signal_Memory_lo vector, as the Descrambled Signal data with SF_lo=1 from Despread Signal Memory A 612 and outputs data e.g., the Despread_Signal_Memory_hi vector, with SF_hi=2 to Despread Signal Memory B 614. This data flow is indicated by the solid arrow data paths from Despread Signal Memory A to the Vector Code Despread and then to Despread Signal Memory B. The Despread Tree Level Control module 430 then sets the Tree Level to 2, and the Vector Code Despread inputs SF_lo=2 data from Despread Signal Memory B 614 and outputs SF_hi=4 data to Despread Signal Memory A 612, following the dashed arrow data paths. At this point Despread Signal Memory A contains 256 despread 'symbols' at spread factor SF=4 which is the lowest allowed spread factor for the UMTS designated CDMA air interfaces. For example, if all 4 spread factor 4 codes were active then Despread Signal Memory A would contain 64 despread symbols for each of the 4 active codes. Typically, however, the active codes are at a higher spread factor than 4 and the 'symbols' in Despread Signal Memory A at this point represent signal data that is only partially despread. In any case, this processing from Despread Signal Memory A or B into the Vector Code Despread and out to Despread Signal Memory B or A, respectively, is repeated with each increase in the Tree Level control parameter from 1 to 8.

The above described A-to-B memory then B-to-A memory iterative despread using the Vector Code Despread module 420 assures that no matter what the active code assignment, the symbols for any given active code channel appear in either Despread Signal Memory A or Despread Signal Memory B at the value of the Tree Level control parameter that is associated with the spread factor of the given active code. For example, if the active code of interest is a single high speed downlink shared channel (HS-DSCH) with spread factor SF=16, then after the Vector Code Despread module 420 executes for Tree Level control parameter=4, Despread Signal Memory A 612 contains the 16 despread symbols for the HS-DSCH that are derived from the current 256 chip input of Descrambled Signal. The location of these 16 symbols within the 256 elements of Despread Signal Memory A has a known dependence on the particular HS-DSCH code of interest.

Referring again to FIG. 4 or 7, the Active Code Soft-Symbol Grabber module 440 monitors the set of active codes as provided by the Identification of Active Codes input 442. For the purpose of describing the present invention, the Identification of Active Codes 442 is considered known. In practice, the Identification of Active Codes is estimated by some means. When the Tree Level 436 identifies a spread factor that contains one or more active codes, the Active Code Soft-Symbol Grabber module 440 inputs 444 the set of despread symbols associated with the active code from the Despread Signal Memory 410 and outputs 446 these despread symbols to the Soft-Symbols Memory 320. Upon completion of the processing for the highest Tree Level of interest (which is Tree Level=8 in the example implementation of FIGS. 4 and 7), the Soft-Symbols Memory 320 contains all of the Soft-Symbol Estimates for Active Codes of interest.

FIG. 7 shows a block diagram of certain processes performed by an alternative example implementation of the Despread module 310 of the present invention. The implementation in FIG. 7 includes a Despread to SF=4 module 710 that inputs the Descrambled Signal, performs computations to provide data that is despread to SF=4, i.e., Tree Level=2, and outputs 720 this data in a sample order that is compatible with the Vector Code Despread computation. This preprocessing of the Descrambled Signal ahead of the Despread Signal Memory 410 allows the Despread Tree Level Control to omit Tree Levels 1 and 2 and instead increments the Tree Level from 3 to 8 in steps of 1. This implementation is motivated by the fact that SF=4 is the minimum utilized spread factor in the UMTS CDMA air interfaces. A consequence of the implementation of the Despread module 310 in FIG. 7 is that the Active Code Soft-Symbol Grabber module 440 and the Vector Code Despread module 420 become active at the same time with Tree Level=3 when Despread Signal Memory 410 receives the output of the Despread to SF=4 module 710.

Figure 8:
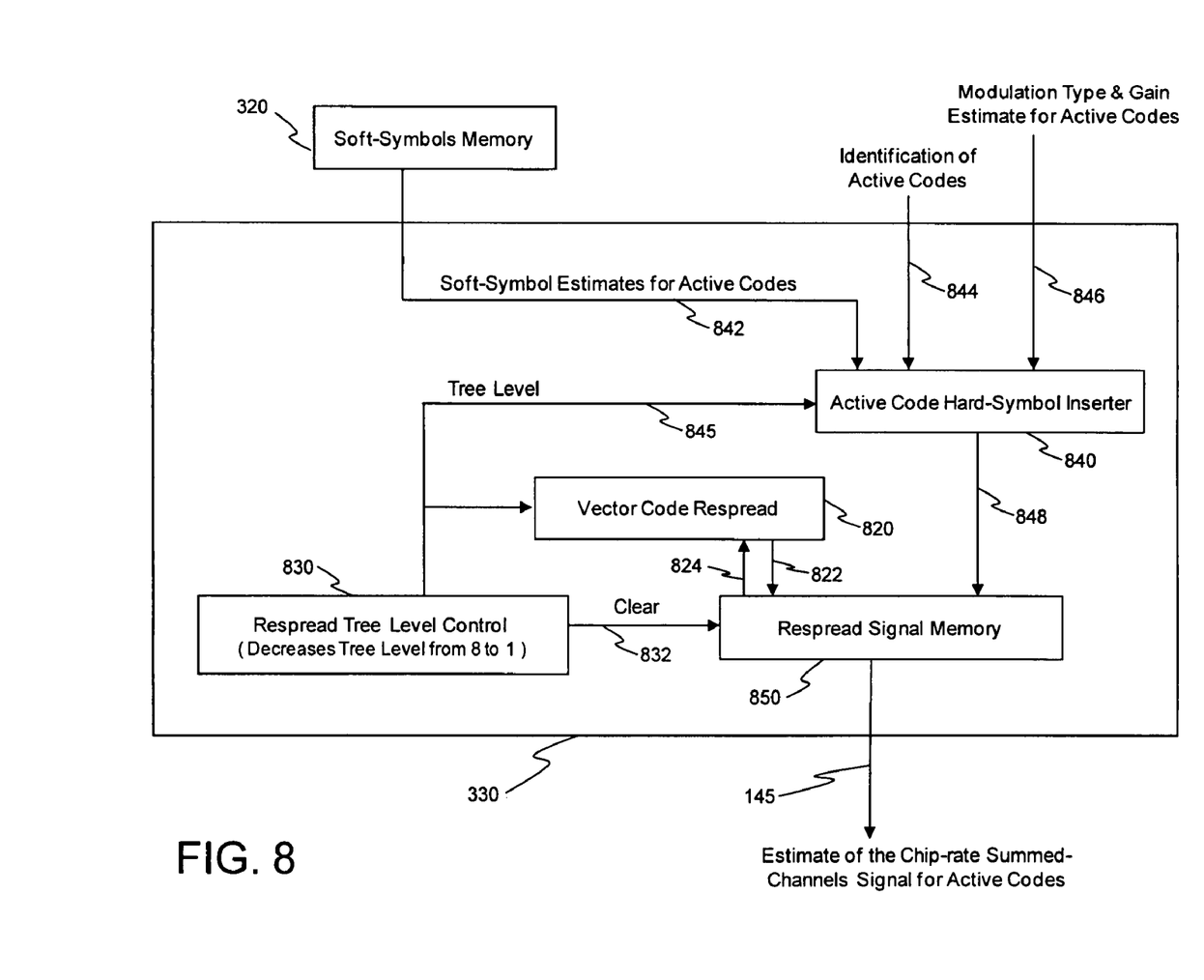
FIG. 8 shows a block diagram of certain processes performed by an implementation of the Respread module in accordance to an embodiment of the present invention.

FIG. 8 shows a block diagram of certain processes performed by an implementation of the Respread module 330 of the present invention. The respread processing begins when the Soft-Symbols Memory 320 contains the Soft-Symbol Estimates for Active Codes provided by the Despread module 310 (as shown in FIG. 3). The Vector Code Respread module 820 and the Active Code Hard-Symbol Inserter module 840 operate in concert to insert the hard-symbols of the active codes, if any, at a given spread factor (or, equivalently, tree level) into the Respread Signal Memory 850. The Respread Tree Level Control module 830 coordinates the Vector Code Respread 820 and Active Code Hard-Symbol Inserter module 840 by decrementing the Tree Level parameter 845 from 8 to 1 in steps of 1. The Respread Tree Level Control module 830 also issues a Clear command 832 to the Respread Signal Memory 850 to initialize the memory to zero at the start of processing for Tree Level=8. The output of the Respread module 330 is the Estimate of the Chip-rate Summed-Channels Signal for the Active Codes and is available at the end of the processing cycle that is associated with Tree Level parameter 845 equal to 1.

The Vector Code Respread module 820 inputs 822 data from formula-addressed input elements of the Respread Signal Memory 850, performs additive operations involving two inputs and two outputs, and outputs 824 data back to formula-addressed output elements of the Respread Signal Memory 850. For example, in a preferred embodiment for a WCDMA downlink receiver, the input 822 and output 824 to the Vector Code Respread module 820 are complex vectors of length 256 and the computation of the Vector Code Respread can be written as:

```
for k = 0, SF_hi, 2*SF_hi, 3*SF_hi ... n*SF_hi< 256
    for m = 1:SF_lo
        A = Input( k + 2*m−1 )
        B = Input( k + 2*m )

C = A + B
        D = A − B

Output( k + m ) = C
        Output( k + SF_lo + m ) = D
    end
end
``` where SF_hi is the input spread factor such that SF_hi=2*SF_lo; where SF_lo is the output spread factor; and where n=(256/SF_hi)−1. The formula-addressed input elements are the elements of the input memory with addresses defined by the formulas k+2*m−1 and k+2*m. The formula-addressed output elements are the elements of the output memory with addresses defined by the formulas k+m and k+SF_lo+m. The simple sum and difference relations between the two input elements, A and B, and the two output elements, C and D, are contained in the above box. If the above mentioned alternative despread normalization scheme is being used these simple sum and difference relations between the two input elements, A and B, and the two output elements, C and D are modified to include a division of the sum and difference relations by the square root of 2. Thus, the alternative despread normalization is associated with a symmetric alternative respread normalization, both of which are a division of the respective sum and difference relations by the square root of 2.

Figure 9:
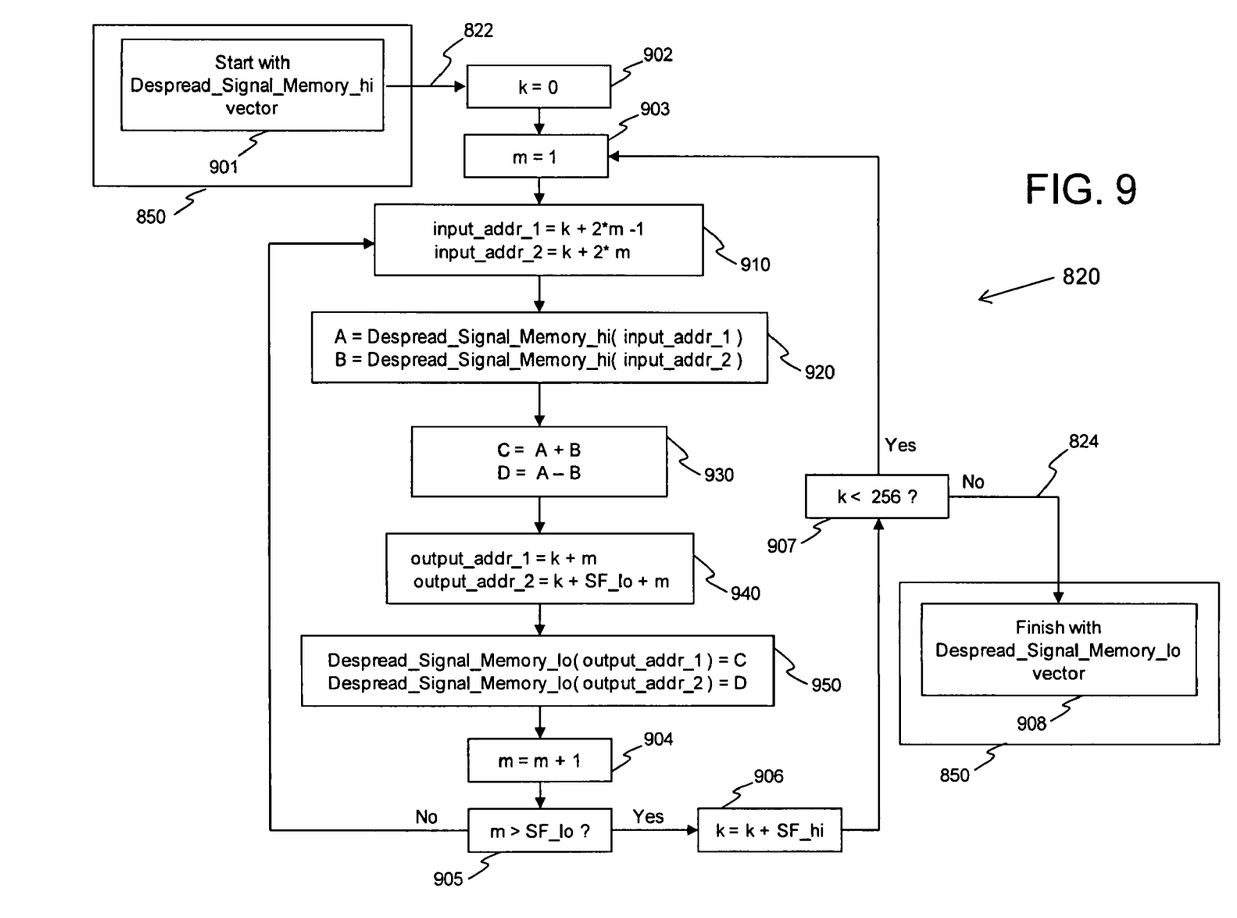
FIG. 9 shows a flow chart diagram of certain processes performed by an implementation of the Vector Code Respread module in accordance to an embodiment of the present invention.

FIG. 9 shows a flow chart diagram of certain processes performed by an implementation of the Vector Code Respread module 820 of the present invention. As indicated in FIG. 9, the Vector Code Respread 820 receives 822 an input vector, Respread_Signal_Memory_hi, from the Respread Signal Memory 850 and provides 824 an output vector, Respread_Signal_Memory_lo, back to the Respread Signal Memory 850. The input of Tree Level 845 is implicit in FIG. 9. Tree Level 845 determines the start and finish spread factors, SF_hi and SF_lo, respectively, according to the Tree Level and Spread Factor relation indicated in FIG. 2. For example, if Tree Level=1, then SF_hi=2, which corresponds to starting 901 with spread factor 2 signal data in Respread_Signal_Memory_hi and also SF_lo=SF_hi/2=1, which corresponds to finishing 908 with fully respread signal data in Respread_Signal_Memory_lo. The Vector Code Respread 820 processing shown in FIG. 9 is repeated for each value of Tree Level 845, for example as indicated in FIG. 8, for each value of Tree Level from 8 to 1.

The control elements 902, 903, 904, 905, 906 and 907 manage the processing indices k and m that are used to compute the input addresses in 910. These input addresses are used in 920 to load input registers A and B from input vector Respread_Signal_Memory_hi. The output registers C and D are computed in module 930 as the sum and difference of A and B, respectively. The processing indices k and m are then used to compute the output addresses in 940. These output addresses are used in 950 to write the values of C and D to the elements in the output vector Respread_Signal_Memory_lo.

The utility of the Vector Code Respread module 820 is that it can be employed to perform the respreading operation for all OVSF active codes. If the input of the Vector Code Respread module contains properly arranged hard-symbols at one Spread Factor or Tree Level of the OVSF code tree, then the module's output contains properly arranged partially respread data at the next lower Spread Factor or, equivalently, the next lower Tree Level of the OVSF code tree. This allows the Vector Code Respread module to be used in an iterative manner to respread the hard-symbols of any active code channel in the OVSF code tree. In an example embodiment, the Respread Signal Memory 850 is partitioned into two halves, Respread Signal Memory A and Respread Signal Memory B, to allow the use of alternating A-to-B memory and B-to-A memory data flows to efficiently support the iterative processing performed by the Vector Code Respread module 820. This A-to-B memory and B-to-A memory iterative data flow can be performed in a manner similar to that shown in FIG. 6 for Vector Code Despread module 420.

Referring again to FIG. 8, the Active Code Hard-Symbol Inserter module 840 inputs the Identification of Active Codes 844 and also inputs the Modulation Type & Gain Estimate for Active Codes 846. For the purpose of describing the present invention, both the Identification of Active Codes and the Modulation Type & Gain Estimate for Active Codes are considered known, although in practice this information requires estimation. When the Tree Level 845 is at a spread factor that contains one or more active codes, the Active Code Hard-Symbol Inserter module 840 inputs the set of soft-symbols 842 that are associated with each active code from the Soft-Symbols Memory 320 and computes a hard-symbol for each soft-symbol by performing a symbol decision based on the value of the soft-symbol and the active code's modulation type and gain estimate parameters. For each soft symbol input 842 the Active Code Hard-Symbol Inserter module 840 outputs the corresponding hard-symbol 848 into the appropriate location of the Respread Signal Memory 850. For each hard-symbol to be inserted, this appropriate location of the Respread Signal Memory 850 is defined by the index formulas of the Vector Code Respread. For the example implementation of a WCDMA downlink receiver, if the active code of interest is HS-DSCH with active code index j=3, then these locations in the Respread Signal Memory 850 are the locations defined by the address=n*16+j for n=0, 1, 2, ... 15 and j=3. In this example, the Active Code Hard-Symbol Inserter module 840 inserts 16 hard-symbols for the HS-DSCH into these 16 addresses of the Respread Signal Memory 850 when Tree Level=4.

Figure 10:
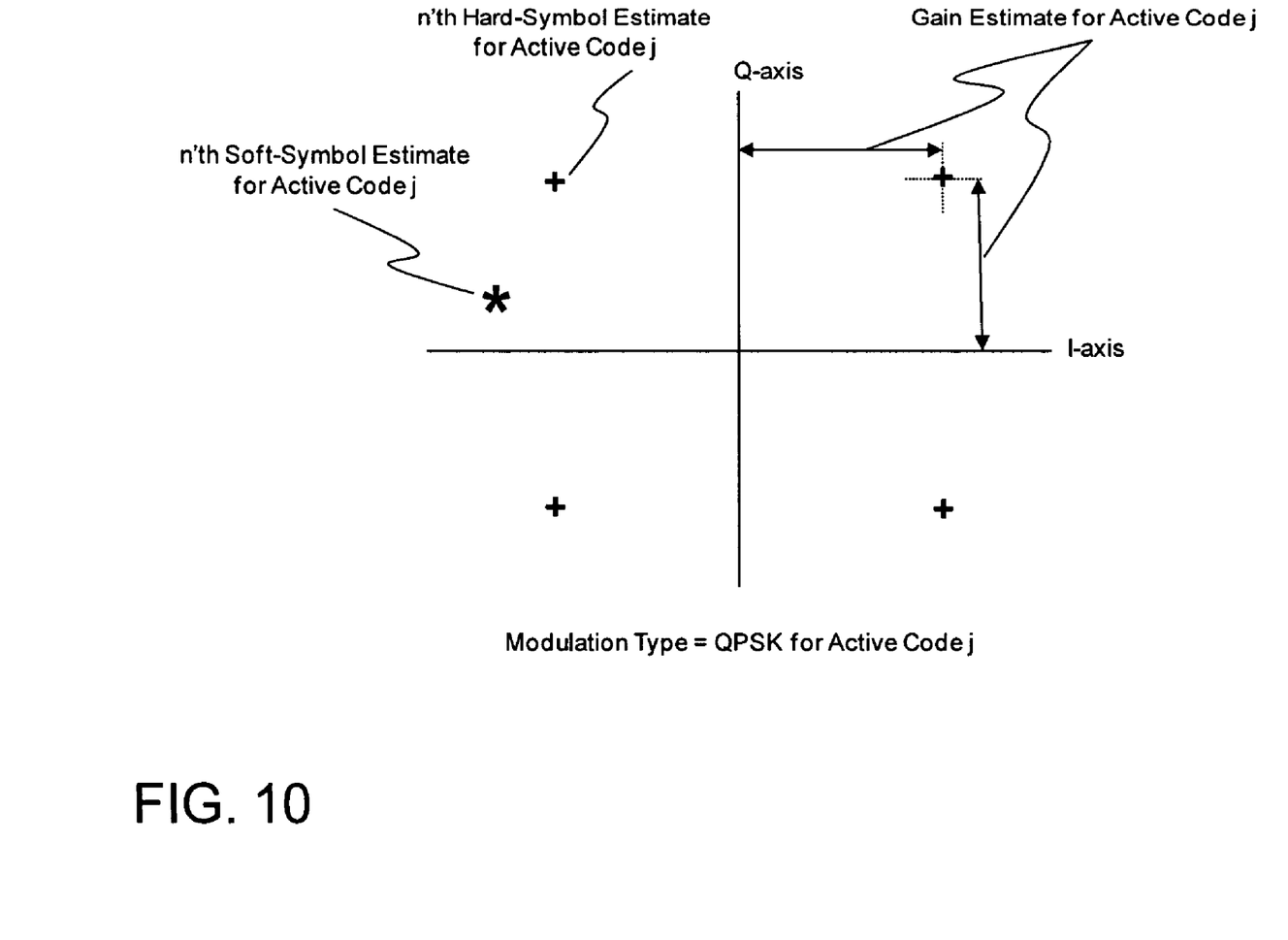
FIG. 10 illustrates an example of how the Active Code Hard-Symbol Inserter module, determines the hard-symbols for each active code channel by performing a symbol decision for each of the code channel's soft-symbols based on the code channel's modulation type and gain estimate parameters in accordance to an embodiment of the present invention.

FIG. 10 illustrates an example of how the Active Code Hard-Symbol Inserter module 840, determines the hard-symbols for each active code channel by performing a symbol decision for each of the code channel's soft-symbols based on the code channel's modulation type and gain estimate parameters. In this example for Active Code j, the modulation type is QPSK and the n'th Soft-Symbol Estimate for Active Code j, e.g., the asterisk symbol in FIG. 10, is in the upper left quadrant defined by the inphase and quadrature axis, e.g., the I-axis and the Q-axis in FIG. 10. The 4 'plus' symbols in FIG. 10 represent the 4 possible QPSK hard-symbol estimates for Active Code j. Each of the 4 possible QPSK hard-symbol estimates is positioned in one of the 4 quadrants such that the distance from the hard-symbol estimates to the I-axis or the Q-axis is equal and determined by the Gain Estimate for Active Code j. Since the asterisks representing the value of the n'th soft-symbol is in the "2nd quadrant" defined by the negative I-axis and the positive Q-axis, the nearest hard-symbol is in that same 2nd quadrant and the Active Code Hard-Symbol Inserter module 840 determines value of the n'th hard-symbol for Active Code j in terms of I,Q coordinates as I=−(Gain Estimate for Active Code j)

Q=+(Gain Estimate for Active Code j).

The Active Code Hard-Symbol Inserter module 840 outputs this value of the n'th hard-symbol for Active Code j into the Respread Signal Memory 850 at the memory location defined by the address=n*16+j.

Referring again to FIG. 8, the proper output of the Respread module 330, i.e., the Estimate of the Chip-rate Summed-Channels Signal for the Active Codes, is determined as a result of the Vector Code Respread module 820 respreading the hard-symbols that have been inserted into the Respread Signal Memory 850 by the Active Code Hard-Symbol Inserter module 840.

Referring to FIG. 3, the Descrambled Signal input to the Despread-Respread module 140 has been converted to Soft-Symbol Estimates for Active Codes by the Despread module 310 and these soft-symbol estimate have been converted to the desired Estimate of the Chip-rate Summed-Channels Signal for the Active Codes by the Respread module 330.

Although embodiments of the present invention have been illustrated in the accompanied figures and described in the foregoing detailed description, it will be understood that the invention is not limited to the embodiments disclosed, but is capable of numerous rearrangements, modifications, and substitutions without departing from the spirit of the invention as set forth and defined by the following claims. For example, the processing in the Despread module 310 can be performed via hardware and/or software using a processor such as a Reduced Instruction Set Computer (RISC) or a Digital Signal Processor (DSP). Further, although depicted in a particular manner, more than one of the depicted or described modules can be utilized in the present invention and functionality provided by one module can be fully and/or partially provided by another one of the modules. Also, the transfer of information from one module to another module can be performed by a wired or a wireless connection.

What is claimed is:

1. A system, comprising:
    a despread module that receives a descrambled signal and an identification of active codes;
    a soft-symbols memory communicably coupled to the despread module; and
    a respread module that receives the identification of active codes, a modulation type and gain estimate for the active codes, and soft symbol estimates for the active codes from the soft-symbols memory which is communicably coupled to the respread module;
    the despread module, comprising:
        a despread signal memory that receives the descrambled signal;
        a vector code despread module communicably coupled to the despread signal memory;
        an active code soft symbol grabber that receives the identification of active codes and is communicably coupled to the despread signal memory;
        wherein the despread signal memory receives properly arranged despread data from the vector code despread module;
        wherein if the despread data is associated with the identification of active codes, the active code soft symbol grabber transfers the despread data from the despread signal memory to the soft-symbols memory.

2. The system of claim 1 comprising a despread tree level control communicably coupled to the vector code despread module and to the active code soft symbol grabber which receive a tree level from the despread tree level control.

3. The system of claim 2, wherein the tree level is incremented as 1,2,3,4,5,6,7,8 so that the vector code despread module provides a sequential despread of the data in the despread signal memory to spread factors of 2,4,8,16,32,64, 128,256, respectively, and so that the active code soft symbol grabber knows the spread factor of the data in the despread signal memory.

4. The system of claim 1, wherein the active code soft symbol grabber outputs the soft symbol estimates for the active codes to the soft-symbols memory.

5. The system of claim 1, wherein the respread module outputs an estimate of a chip rate summed channels signal for the active codes.

6. The system of claim 1, wherein the soft symbol estimates for the active codes are received by the soft-symbols memory from the despread module.

7. The system of claim 6, wherein the soft-symbols memory stores the soft symbol estimates for the active code channels.

8. A system, comprising:
    a despread module that receives a descrambled signal, an identification of active codes, and properly arranged despread data;
    a soft-symbols memory communicably coupled to the despread module; and a respread module that receives the identification of active codes, a modulation type and gain estimate for the active codes, and soft symbol estimates for the active codes from the soft-symbols memory which is communicably coupled to the respread module;

wherein if the properly arranged despread data is associated with the identification of active codes, the despread module transfers the despread data to the soft-symbols memory.

9. A system, comprising:

a despread signal memory that receives a descrambled signal;

a vector code despread module communicably coupled to the despread signal memory;

an active code soft symbol grabber that receives an identification of active codes and is communicably coupled to the despread signal memory;

wherein the despread signal memory receives properly arranged despread data from the vector code despread module;

wherein if the despread data is associated with the identification of active codes, the active code soft symbol grabber transfers the despread data from the despread signal memory to the soft-symbols memory.

10. A system, comprising:

a despread module that receives a descrambled signal and an identification of active codes;

a soft-symbols memory communicably coupled to the despread module; and a respread module that receives the identification of active codes, a modulation type and gain estimate for the active codes, and soft symbol estimates for the active codes from the soft-symbols memory which is communicably coupled to the respread module;

the respread module, comprising:

an active code hard-symbol Inserter module that receives soft-symbol estimates for active codes, identification of the active codes and modulation type and gain estimates for the active codes;

a respread signal memory that receives a hard-symbol from the active code hard-symbol inserter module;

a vector code respread module; and a respread tree level control module that transmits a tree level to the active code hard-symbol inserter module and the vector code respread module;

the vector code respread module provides data to formula-addressed output elements of the respread signal memory; and the respread signal memory outputs an estimate of a chip-rate summed-channels signal for the active codes.

11. A system, comprising:

an active code hard-symbol inserter module that receives soft-symbol estimates for active codes, identification of the active codes and modulation type and gain estimates for the active codes;

a respread signal memory that receives a hard-symbol from the active code hard-symbol inserter module;

a vector code respread module; and a respread tree level control module that transmits:

a tree level to the active code hard-symbol inserter module and the vector code respread module; and a clear message to the respread signal memory;

the vector code respread module:

inputs data from formula-addressed input elements of the respread signal memory;

performs additive operations involving two inputs and two outputs; and provides data back to formula-addressed output elements of the respread signal memory;

the respread signal memory outputs an estimate of a chip-rate summed-channels signal for the active codes.

12. The system of claim 11, wherein the active code hard-symbol inserter module inputs the set of soft-symbols that are associated with the active code from the soft-symbols memory.

13. The system of claim 12, wherein the active code hard-symbol inserter module computes a hard-symbol for each soft-symbol by performing a symbol decision based on the value of the soft-symbol.

14. The system of claim 12, wherein the active code hard-symbol Inserter module computes a hard-symbol for each soft-symbol by performing a symbol decision based on the active code's modulation type and gain estimate parameters.

15. The system of claim 11, wherein the active code hard-symbol inserter module outputs the corresponding hard-symbol, for each soft symbol input, into an appropriate location of the respread signal memory.

16. The system of claim 15, wherein the appropriate location of the respread signal memory, for each hard-symbol to be inserted, is defined by the index formulas of the vector code respread.

17. The system of claim 11, wherein the respread signal memory outputs the estimate of the chip-rate summed-channels signal for the active codes upon completion of processing for Tree Level=1.

* * * * *